United States Patent [19]

Kondoh et al.

[11] Patent Number: 5,093,845

[45] Date of Patent: Mar. 3, 1992

[54] SIGNAL GENERATOR FOR GENERATING PULSE SIGNALS HAVING PARTICULAR WAVEFORMS FOR DATA TRANSMISSION AND METHOD OF OPERATION

[75] Inventors: Harufusa Kondoh; Takeo Nakabayashi, both of Hyogo, Japan

[73] Assignee: Mitsubishi Denki Kabushiki Kaisha, Tokyo, Japan

[21] Appl. No.: 584,013

[22] Filed: Sep. 18, 1990

[30] Foreign Application Priority Data

Oct. 2, 1989 [JP] Japan .................. 1-257212

[51] Int. Cl.$^5$ ............................................. H04B 14/02
[52] U.S. Cl. .................................. 375/25; 375/27; 370/110.2; 365/189.02
[58] Field of Search ............... 375/25, 27, 59; 328/36, 328/60, 61; 370/110.1, 110.2, 110.3; 340/728, 729; 307/356; 365/189.02

[56] References Cited

U.S. PATENT DOCUMENTS

| | | | |
|---|---|---|---|
| 4,464,656 | 8/1984 | Nakamura | 340/729 |
| 4,774,692 | 9/1988 | Oishi et al. | 307/356 |
| 4,825,416 | 4/1989 | Tam et al. | 365/189.02 |

FOREIGN PATENT DOCUMENTS 62-237803 10/1987 Japan .
63-185105 7/1988 Japan .

OTHER PUBLICATIONS

Hardwick, "ISDN Design: A Practical Approach", Academic Press, Inc., Harcourt Brace Javanovich, Publishers.
AT&T Preliminary Data Sheet, "LC1046 Digital Signalling Interface".
Recommendation I.431, CCITT.

*Primary Examiner*—Benedict V. Safourek
*Assistant Examiner*—Young Tse
*Attorney, Agent, or Firm*—Lowe, Price, LeBlanc & Becker

[57] ABSTRACT

A signal generator for generating pulse signals having a waveform required by the Recommendation of International Telegraph and Telephone Consultative Committee (CCITT) is disclosed. The signal generator utilizes two D/A converters whereby the limitation of the operable frequency of the D/A converters restricts the variation rate of the output pulses. Each D/A converter provides the converted analog signal to the pulse transformer at timings different from one another. The pulse transformer detects the difference between the provided analog signals and provides a pulse signal having the required waveform. The difference of the output voltages between the two D/A converters varies at two times the operable frequency rate of the D/A converters, resulting in the pulse signals changing at a rate exceeding the operation frequency of the D/A converters.

16 Claims, 10 Drawing Sheets

DATA DENOTED ○ IS STORED IN MEMORY 3a

DATA DENOTED X IS STORED IN MEMORY 3b

SIGNAL GENERATOR FOR GENERATING PULSE SIGNALS HAVING PARTICULAR WAVEFORMS FOR DATA TRANSMISSION AND METHOD OF OPERATION

BACKGROUND OF THE INVENTION

1. Field of the Invention

This invention generally relates to signal generators for communication, and more particularly to signal generators for generating a pulse signal having a particular waveform for data transmission. This invention has a particular application to the generation of pulse signals satisfying the pulse mask for interfaces recommended by International Telegraph and Telephone Consultative Committee for Integrated Services Digital Network.

2. Description of the Background Art

Open Systems Interconnection (hereinafter referred to as "OSI") is a network architecture which is now being standardized by International Telegraph and Telephone Consultative Committee (referred to as "CCITT" hereinafter) and International Organization for Standardization (referred to as "ISO" hereinafter) for allowing data transmission between equipments and between systems of computers and terminal devices thereof made by different manufacturers. This standardization is necessary for the implementation of high level data transmission in Integrated Services Digital Network (referred to as "ISDN" hereinafter).

It can be said that ISDN is a system for realizing various communication such as telephone, facsimile communication, data communication, and image communication by a digitalized network. In conventional communication services, the interface between the terminal equipment of the user and the communication network was limited to specific applications, such as for telephone and data communication. In ISDN, an integrated interface is defined for the above-mentioned various services. This interface is called the various purpose user network interface, which is clearly defined by CCITT.

Figure 6A:
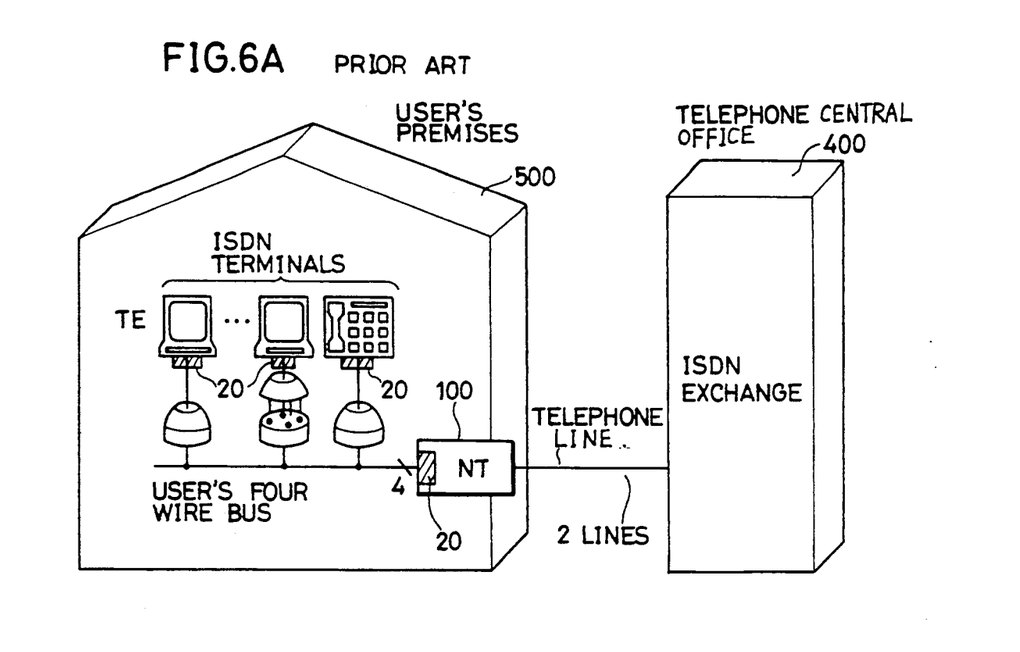
FIG. 6A is a conceptional diagram showing an example of an application of ISDN.

FIG. 6A is a conceptional diagram showing an example of an application of ISDN. Referring to FIG. 6A, ISDN exchange device 400 of the telephone central office and ISDN terminals (TE) of the user's premises 500 are connected via the telephone line in ISDN. User's premises 500 is provided with a network terminating device (NT) 100, to which a telephone line and a four-wire in-house bus are connected. The ISDN terminals are connected to network terminating device 100 via the four-wire in-house bus. The terminating device 100 is provided with an interface circuit 20 for connecting the four-wire in-house bus. Each ISDN device also comprises interface circuit 20.

Figure 6B:
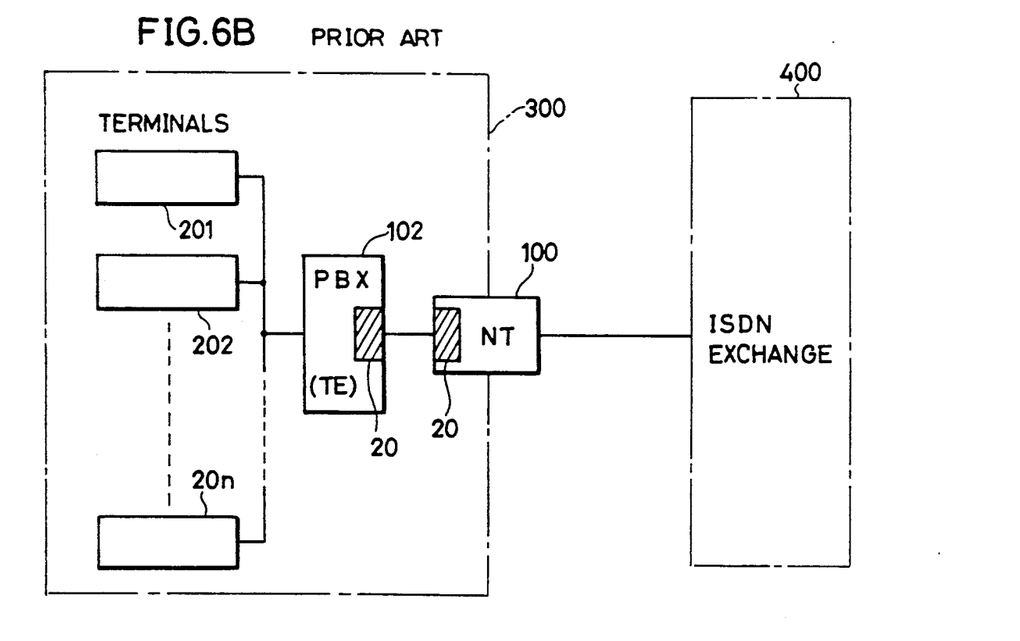
FIG. 6B is a block diagram showing an example of the primary rate interface in ISDN.

In addition to the example of the aforementioned ISDN, FIG. 6B shows an example of the primary rate interface in ISDN. This primary rate interface is described in a textbook titled "ISDN Design A Practical Approach" (by S. Hardwick, 1989, ACADEMIC PRESS, Inc. Copywrite). Referring to FIG. 6B, network terminating device 100 is implemented at the entrance of ISDN of the user's site 300 inside the building or factory. Line terminating device 100 is connected to a private branch exchange (PBX) 102 via the four-wire bus. Private branch exchange 102 operates as the user terminal (TE) in ISDN. Terminal equipments 201-20n such as telephones and facsimile machines are connected to private branch exchange 102.

In ISDN, various users terminals are connected to network terminating devices through user-network interfaces. Thus, users are able to receive the services of ISDN via terminals. In Recommendation I. 431 by CCITT, a primary rate user-network interface is defined, with physical and electrical matters concerning the user-network interface described in Layer 1.

Figure 6C:
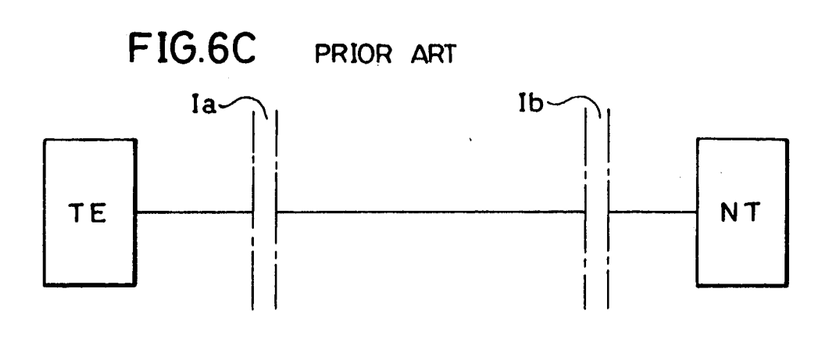
FIG. 6C is a conceptional diagram showing the connection between a user terminal and a network terminating service recommended by CCITT.

FIG. 6C is a conceptional diagram showing the connection between a user terminal TE and a network terminating device NT described in CCITT's Recommendation. As illustrated in FIG. 6C, user-network interfaces Ia and Ib are provided at each I/O port of the user terminal TE and the network terminating device NT, respectively. That is to say, each interface circuit 20 shown in FIGS. 6A and 6B are equivalent to the user network interface 1A or 1B shown in FIG. 6C.

Figure 6D:
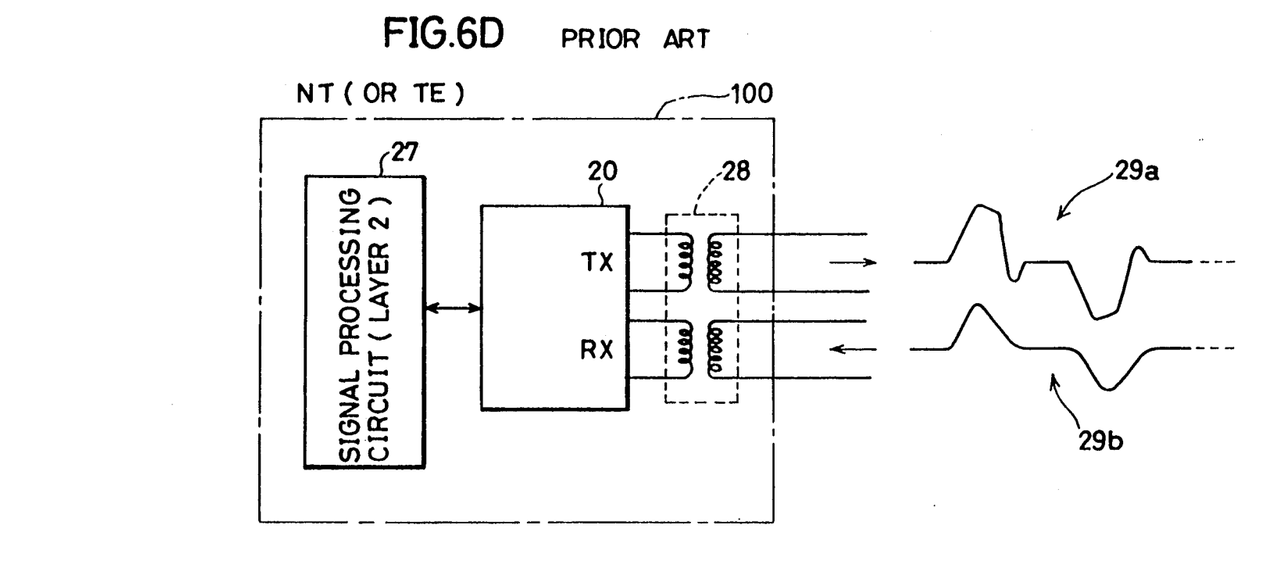
FIG. 6D is a block diagram of the network terminating device shown in FIGS. 6A and 6B.

FIG. 6D is a block diagram of the network terminating device 100 shown in FIGS. 6A and 6B. Referring to FIG. 6D, network terminating device 100 comprises a transformer 28 for transmission and reception, a LSI chip 20 for data transmission and reception, and a signal processing circuit 27 of a higher level (Layer 2 for example). The interface circuit 20 shown in FIGS. 6A and 6B is equivalent to LSI chip 20. It is to be noted that LSI chip 20, signal processing circuit 27, and transformer 28 are provided in each user terminal (TE).

In operation, LSI chip 20 transmits transmission data signal $29a$ and receives reception data signal $29b$, via transformer 28. Although transmission data signal $29a$ has the waveform defined in CCITT's Recommendation which will be explained later, reception data signal $29b$ has the waveform thereof changed by data transmission. The signal processing circuit 27 provides the data to be transmitted to LSI chip 20, and receives the reception data. The signal processing circuit 27 carries out signal processing in Layer 2 of ISDN.

Figure 7:
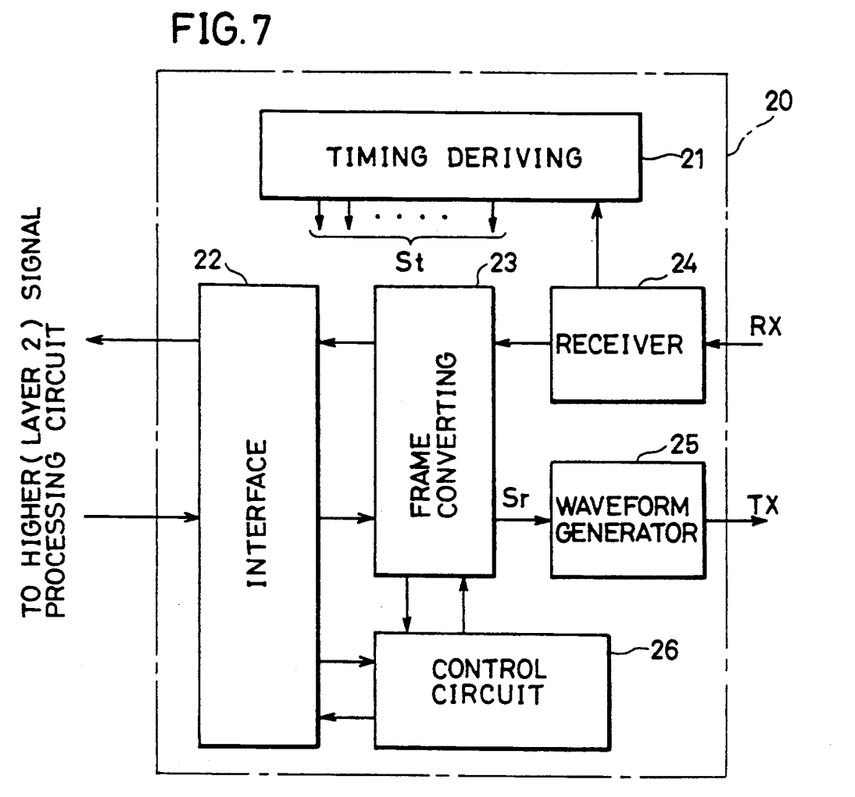
FIG. 7 is a block diagram of a circuit configuration of a communication LSI chip applied as the user-network interface shown in FIG. 6D.

FIG. 7 is a block diagram showing a circuit configuration of communication LSI chip 20 employed as the user-network interface indicated in FIG. 6C. The LSI chip 20 of FIG. 7 is described in the Preliminary Data Sheet of AT & T titled "LC1046 Digital Signaling Interface". Referring to FIG. 7, LSI chip 20 comprises a receiver 24 and a waveform generator 25 for receiving and transmitting data signals with the user terminal or network terminating device, a timing deriving circuit 21 responsive to a reception signal RX for generating various timing signals, a frame converting circuit 23 for adapting the data frame between higher (Layer 2 for example) signal processing circuits, and an interface circuit 22 for connecting to the signal processing circuit, and a control circuit 26 for controlling the respective circuits in the LSI chip.

In operation, the timing deriving circuit 21 generates various timing signals St in response to data signal RX received by the receiver 24. After the received data signal RX has its data frame converted by the frame converting circuit 23, it is provided to the signal processing circuit via the interface circuit 22. The input signal from the signal processing circuit is applied to the frame converting circuit 23 via the interface circuit 22. Frame converting circuit 23 converts the frame of the data signal which comes from the interface circuit 22, and supplies a converted signal to the waveform generator 25. The waveform generator 25 outputs a pulse signal TX having a predetermined waveform in response to the timing signal from the frame converting circuit 23. The output pulse TX is transmitted towards the user terminal or the network terminating device.

Figure 8:
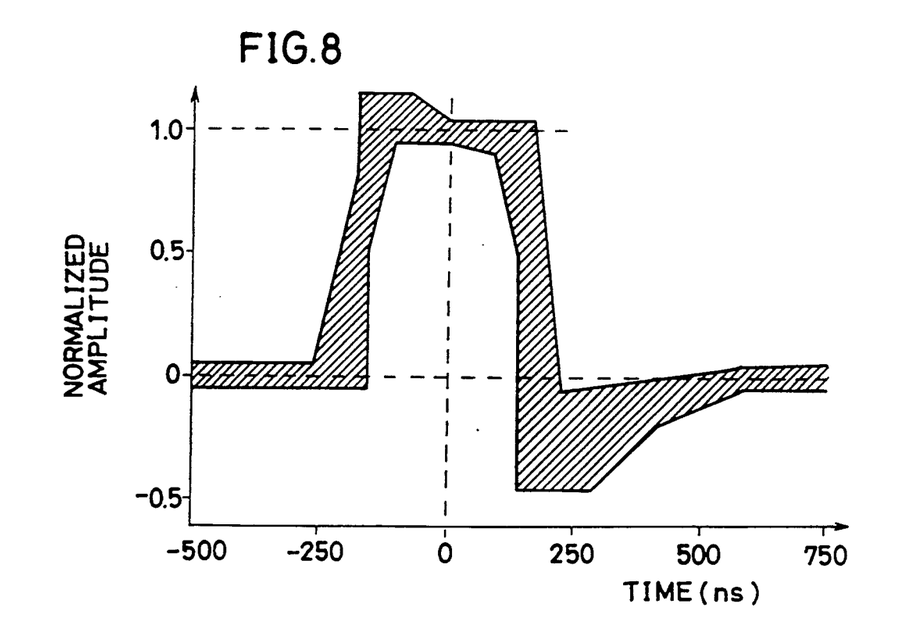
FIG. 8 is a waveform diagram showing the pulse mask defined in CCITT's recommendation.

FIG. 8 is a waveform diagram showing the pulse mask (the acceptable range of a pulse waveform) defined by the Recommendation of CCITT. The details of this pulse mask is described in the afore-mentioned textbook titled "ISDN Design A Practical Approach". In FIG. 8, the axis of ordinate indicates the normalized amplitude, and the axis of abscissa indicates the time (ns). The waveform of the pulse signal TX from the waveform generator 25 shown in FIG. 7 is defined within the hatched area of the waveform diagram shown in FIG. 8. One reason why the pulse signal TX requires this particular waveform is that there is a need to prevent the average value of the signal level from having a certain value (i.e. the DC value). That is to say, if pulse signal TX includes a DC signal component, saturation of the pulse transformer utilized in transmission is induced, in addition to the increase in power consumption of the DC current. Moreover, it is required that pulse signal TX has the particular waveform shown in FIG. 8 for also limiting the frequency band of the pulse signal TX.

Figure 9:
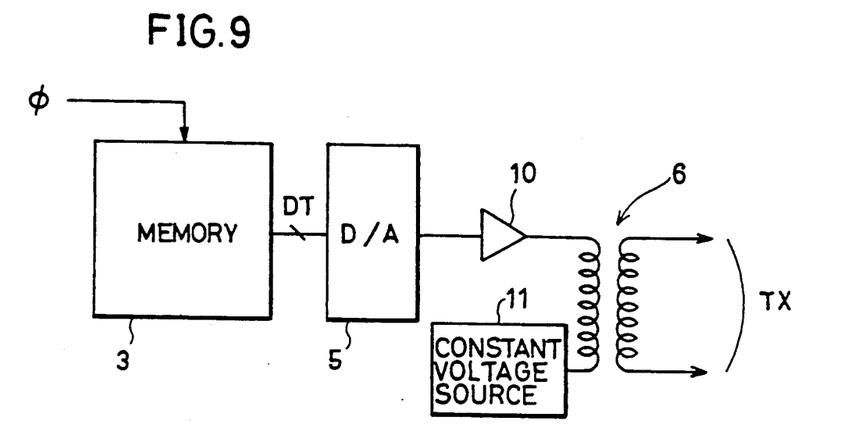
FIGS. 9 and 10 are block diagrams each showing an example of a conventional waveform generator.

FIG. 9 is a block diagram showing an example of a waveform generator. Referring to FIG. 9, the waveform generator comprising a memory 3 for storing waveform data to define a pulse signal having a particular waveform, a D/A converter 5 for providing analog signals according to the data from the memory 3, a buffer 10 connected to the output of the D/A converter 5, and a pulse transformer 6 having the primary side connected to the buffer 10 and the constant voltage source 11. From the secondary side of the pulse transformer 6, the pulse signal TX having a determined waveform is provided.

In operation, the memory 3 responds to the clock signal $\phi$ for applying a waveform data to the D/A converter 5. The D/A converter 5 provides an analog signal according to the applied waveform data, and supplies it to the pulse transformer 6 via the buffer 10. The pulse transformer 6 provides a pulse signal TX according to a difference between the output voltage from the buffer 10 and the voltage output from the constant voltage source 11.

Figure 10:
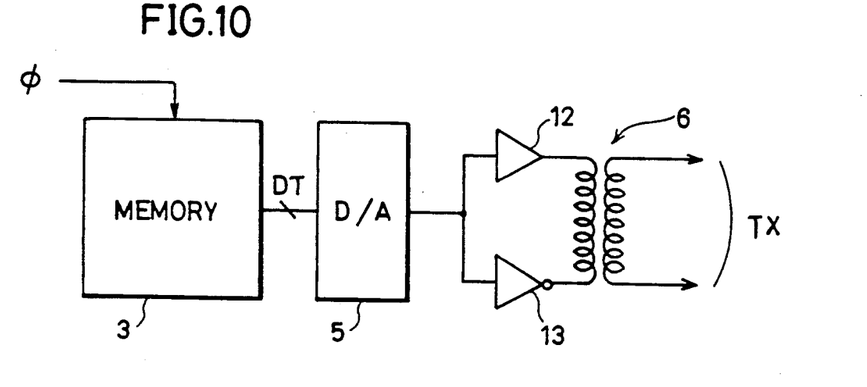

FIG. 10 is a block diagram showing another example of a waveform generator. Referring to FIG. 10, the difference in comparison with the circuit shown in FIG. 9 is that a inverter 13 is connected to the primary side of the pulse transformer 6 in place of the constant voltage source 11. The pulse transformer 6 responds to the complementary voltages output from the buffer 12 and the inverter 13 to generate the pulse signal TX. The waveform generator shown in FIG. 10 can provide a pulse signal TX having an amplitude larger than that of the waveform generator shown in FIG. 9.

Both waveform generators shown in FIGS. 9 and 10 provide the pulse signal TX at the output timing of the D/A converter 5, that is, responds to the sampling pulse $\phi$. The D/A converter 5 is formed by a MOS process in the same manner as in the case of the other circuits in the LSI chip. The operating speed of the D/A converter 5 implemented with a MOS transistor is generally lower than that of the one implemented with the bipolar transistor. This means that the frequency of the pulse signal TX provided from the pulse transformer 6 is limited. As a result, it was not possible to obtain a pulse signal TX of a higher frequency when using a conventional waveform generator.

Figure 11:
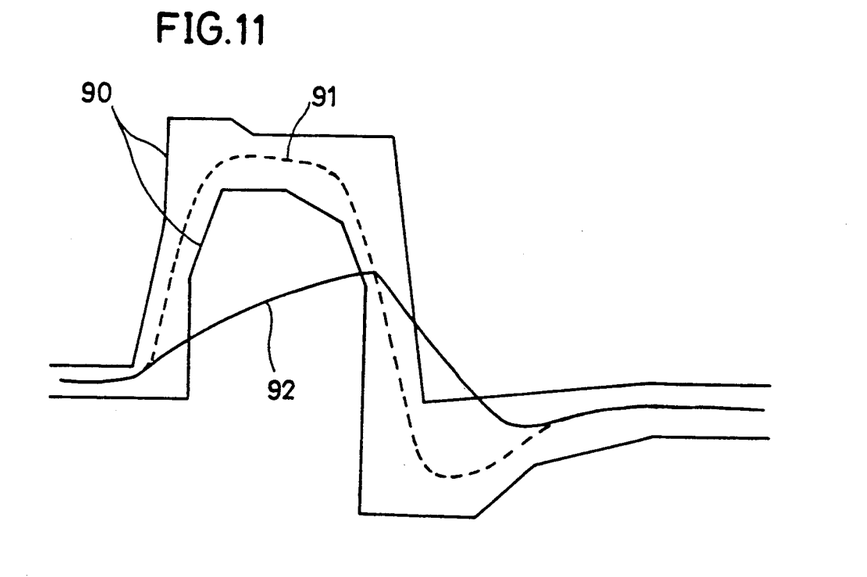
FIG. 11 is a waveform diagram showing the signal generated from the waveform generator of FIGS. 9 and 10.

Referring to FIG. 11, the area surrounded by curve 90 is equivalent to the allowable signal waveform of the 1 bit data defined by CCITT's Recommendation. The signal wave form indicated by broken line 91 ideally satisfies the Recommendation. However, the waveform generator shown in FIGS. 9 and 10 generates pulse signal TX of 1 bit data having a signal waveform indicated by curve 92. It is noted that the pulse signal indicated by curve 92 has a low slew rate.

Figure 12:
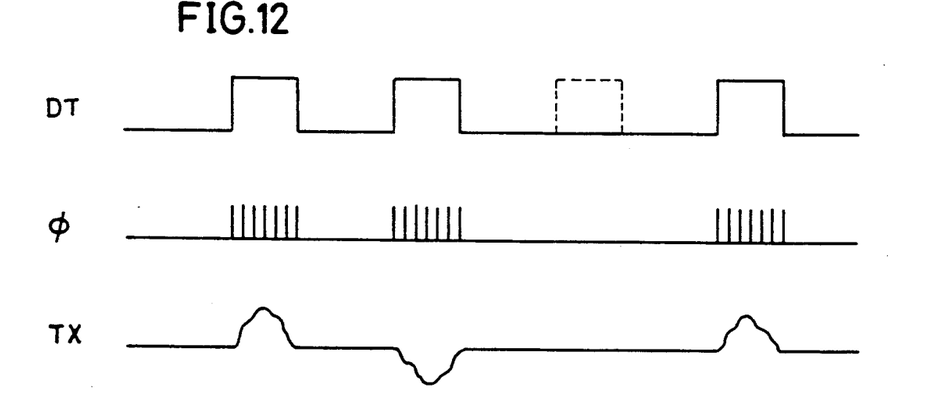
FIG. 12 is a timing chart for showing the operation of the waveform generator of FIGS. 9 and 10.

Referring to FIG. 12, the memory 3 shown in FIGS. 9 and 10 provides waveform data DT to D/A converter 5 in response to clock signal $\phi$. It can be understood that the waveform generator shown in FIGS. 9 and 10 generates pulse signal TX having the aforementioned low slew rate.

SUMMARY OF THE INVENTION

One object of the present invention is to generate pulse signals having a rapidly changing waveform in a data signal generator for data transmission.

Another object of the invention is to generate pulse signals having a waveform with the higher slew rate for data transmission.

A further object of the invention is to generate pulse signals at a slew rate sufficiently high to satisfy the pulse mask requirements defined in CCITT's Recommendation for data transmission.

A still further object of the invention is to generate pulse signals using MOS implemented digital to analog conversion that have a slew rate exceeding the capability of currently available converters.

Another object of the invention is to generate pulse signals having a particular waveform variable at two times the frequency of a given timing signal in a data signal generator for data transmission.

A further object of the invention is to generate at a higher slew rate pulse signals which satisfy the pulse mask defined in CCITT's Recommendation in a data signal generator for data transmission.

Still a further object of the invention is to generate pulse signals having a waveform at a frequency exceeding the operable frequency of the employed D/A converter in a data signal generator for data transmission.

In summary, the data signal generator in accordance with the present invention comprises timing signal generating circuitry for generating first and second phase displaced timing signals, a first waveform signal generating circuitry in response to a first timing signal for generating a first signal component of a predetermined waveform, a second waveform signal generating circuitry in response to a second timing signal for generating a second signal component of a predetermined waveform, and difference detecting circuitry in response to the first and second waveform signal components for providing the predetermined waveform.

In operation, the first and second waveform signal components are applied to the difference detecting circuitry at a phase displaced timing. The difference detecting circuitry detects the difference of the first and second waveform signal components to provide a specific waveform. Because the detected difference changes at a frequency of two times the frequency of the first and second timing signals, a waveform having a high slew rate is obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
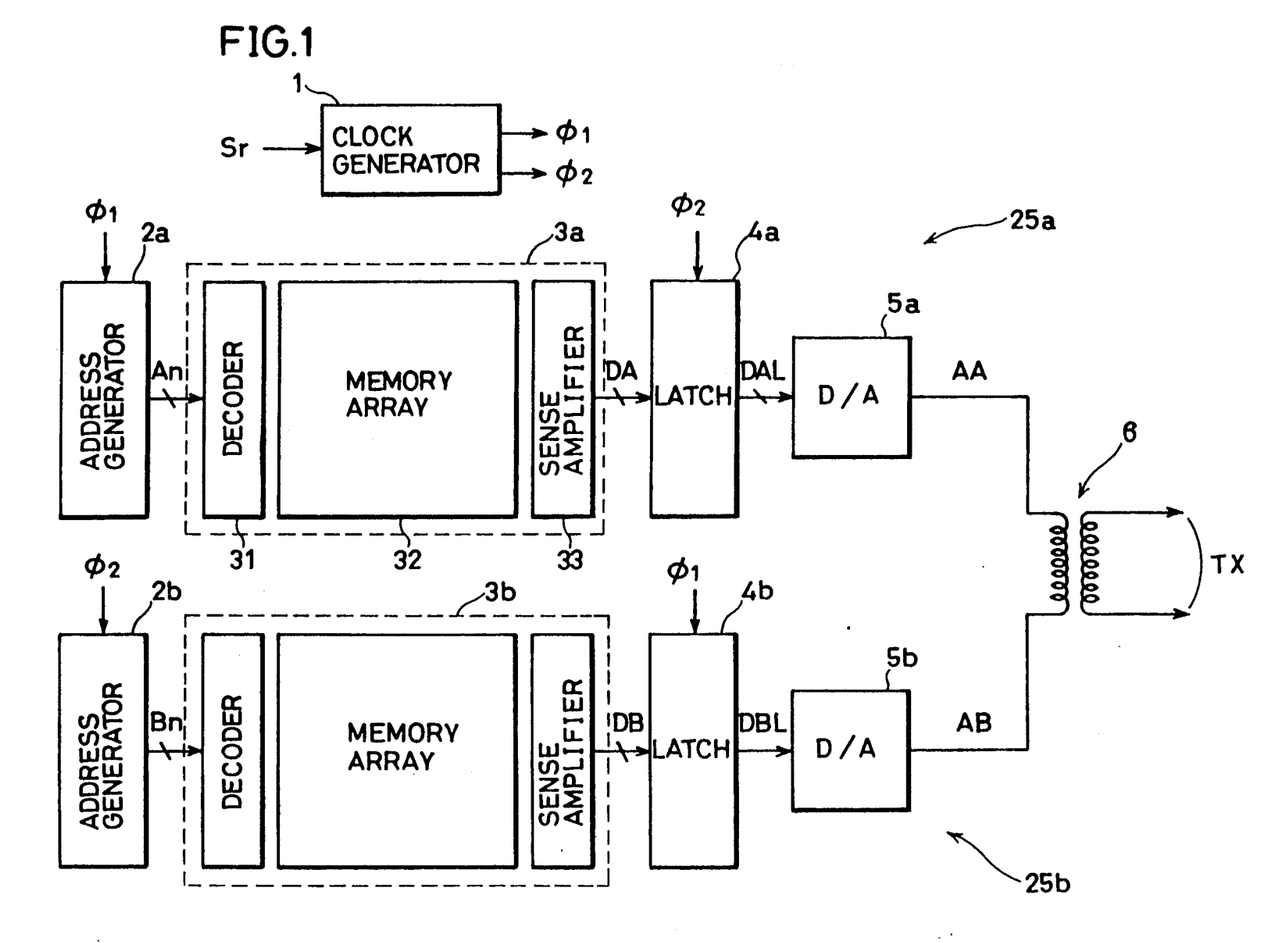
FIG. 1 is a block diagram of a circuit of a waveform generator showing an exemplary embodiment of the invention.

Referring to FIG. 1, the waveform generator comprises a clock generator 1 for generating clock signals (non-overlap clocks) $\phi 1$ and $\phi 2$ having the same repetition rate and displaced in phase from each other, signal generating portions 25a and 25b responsive to clock signals $\phi 1$ and $\phi 2$ for generating analog signals AA and AB respectively, having the same repetition rate and displaced in phase from one another, and a pulse transformer 6 combining the signals AA and AB for providing a pulse signal TX. Pulse signal TX has a waveform which substantially satisfies CCITT's Recommendation of FIG. 8. The signal generating portion 25a comprises an address generator a responsive to the clock signal $\phi 1$ for providing an address signal An, a memory 3a where data for forming the required pulse waveform is previously stored, a latch circuit 4a responsive to the clock signal $\phi 2$ for latching data DA read out from the memory 3a, and a D/A converter 5a for D/A converting the output data DAL from the latch circuit 4a. The memory 3a comprises a decoder 31 for decoding the address signal An, a memory array 32 including a number of memory cells, and a sense amplifier 33 for amplifying the data signal read out from the memory array 32. Likewise, signal generating portion 25b comprises an address generator 2b, a memory 3b, a latch circuit 4b and a D/A converter 5b.

Figure 2:
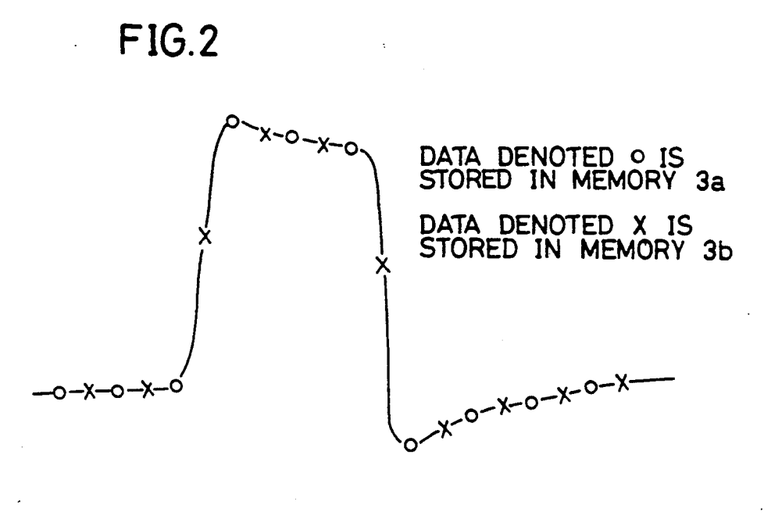
FIG. 2 is a waveform diagram explaining the sampling timing of the waveform data to be stored in the memory shown in FIG. 1.

Referring to FIG. 2, O denotes data to be stored in the memory 3a, and X denotes data to be stored in memory 3b. It is assumed that the waveform shown in FIG. 2 satisfies the requirements of the Recommendation by CCITT in FIG. 8. According to the Recommendation, the level of the signal changes most rapidly at the fall edge portion of the pulse waveform. The pulse waveform requires approximately 75ns to fall down. This time length is equivalent to about one ninth of a period of the 1544kbps data transmission rate utilized in ISDN. Therefore, a time width below 75ns is required as a sampling rate for A/D conversion, resulting in at least 16 points to be sampled for one waveform. Accordingly, the waveform data stored in memories 3a and 3b should include a total of at least 16 points of the data to be sampled. The sampling rate is 24.7MHz at the time when the waveform is sampled at the 16 points. The above description is only by way of an example, and it would be necessary to increase the number of sampling points in order to obtain a more precise particular waveform.

Figure 3A:
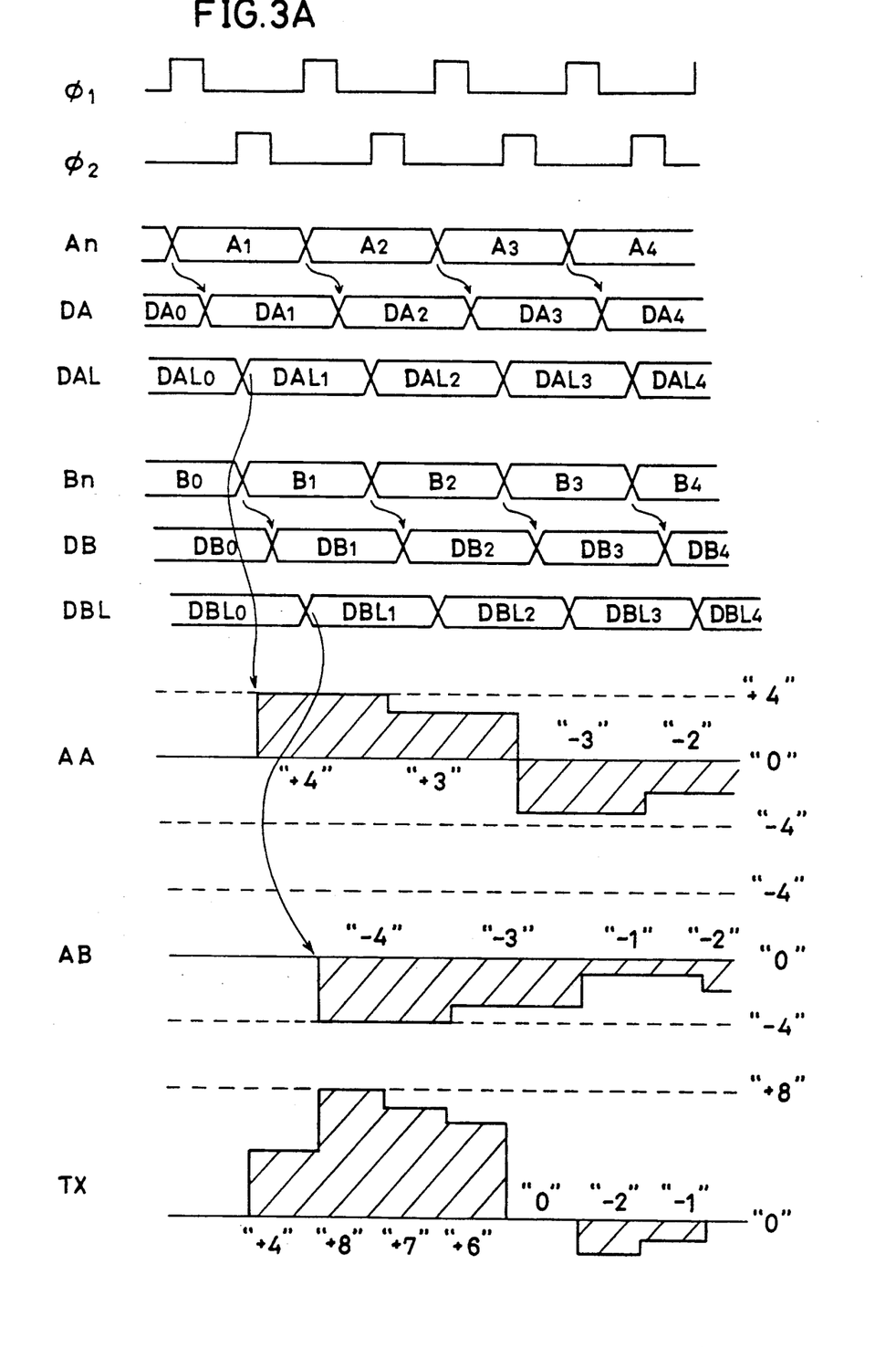
FIGS. 3A and 3B are timing diagrams for explaining an operation of the waveform generator shown in FIG. 1.

Referring to FIGS. 1 and 3A, the operation of the waveform generator will be explained hereinafter. Request signal Sr from a circuit requesting the generation of a pulse signal, such as a frame converting circuit 23 shown in FIG. 7, is supplied to the clock generator 1. The clock generator 1 responds to the signal Sr for providing clock signals $\phi 1$ and $\phi 2$ having repetitious cycles at timings different from one another, as shown in FIG. 3A. An address generator 2a responds to the clock signal $\phi 1$ for supplying a sequence of address signal An to the decoder 31 in a well known manner. Then the decoder 31 responds to an address signal An for sequentially specifying the memory cell in the memory array 32 which stores the data required to form the pulse waveform. The sense amplifier 33 amplifies the data signal read out from the specified memory cell and provides the amplified signal DA to the latch circuit 4a. Thus, the data DA denoted as O in FIG. 2 will be supplied to the latch circuit 4a. Meanwhile, the address generator 2b responds to the clock signal $\phi 2$ from the clock generator 1 and provides an address signal Bn. In the same manner as explained above, the memory 3b provides data DB denoted as X in FIG. 2.

After the latch circuit 4a responds to the clock signal $\phi 2$ for latching the read out data DA, the latched data DAL is applied to the D/A converter 5a. In the D/A converter 5a, the data DAL is D/A converted to provide an analog signal AA. In a similar manner, the latch circuit 4b responds to the clock signal $\phi 1$ for latching the data DB and supplies the latched DBL to A/D converter 5b. The D/A converter 5b provides an analog signal AB which is converted according to data DBL. Thus, as shown in FIG. 3A, each of the analog signals AA and AB provided from the D/A converters 5a and 5b respectively, changes at timings different from one another, that is, they changed in response to the clock signals $\phi 2$ and $\phi 1$, respectively. By detecting the difference between the analog signals AA and AB, the pulse transformer 6 provides the pulse signal TX having the desired waveform, that is, the waveform which complies with the pulse mask shown in FIG. 8.

Accordingly, the differential voltage between the analog signals AA and AB varies at half the time length of the period of the clock signals φ1 and φ2. This means that the pulse signal TX varying at the rate of two times the frequency of the operation of the D/A converters 5a and 5b can be obtained. In contrast to the pulse signal TX having a varying rate limited by the D/A converter 5 in circuits shown in FIGS. 9 and 10, the pulse signal TX is obtained which varies at two times the frequency of the clock signals φ1 and φ2 provided as above, that is, which varies at two times the operation frequency of the D/A converters 5a and 5b. In other words, this waveform generator can generate pulse signal TX having a higher slew rate.

Figure 3B:
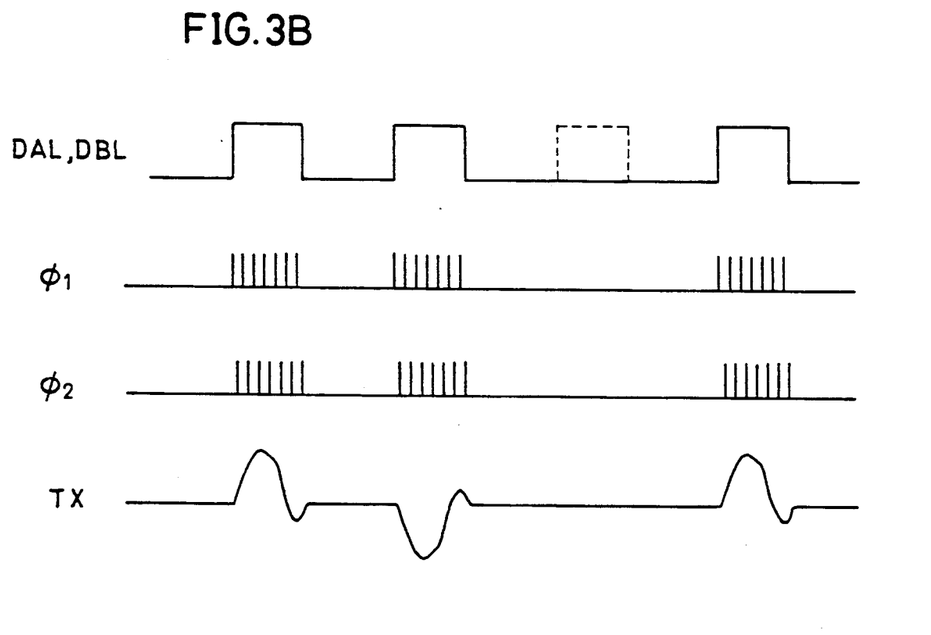

Referring to FIG. 3B, the generation of three pulse signals TX satisfying the pulse mask of FIG. 8 is shown. In accordance with data DAL and DBL shown schematically, pulse signal TX is generated in response to two clock signals φ1 and φ2. In comparison with the timing chart of FIG. 12, it is noted that the slew rate of the generated pulse signal TX is higher.

Figure 4:
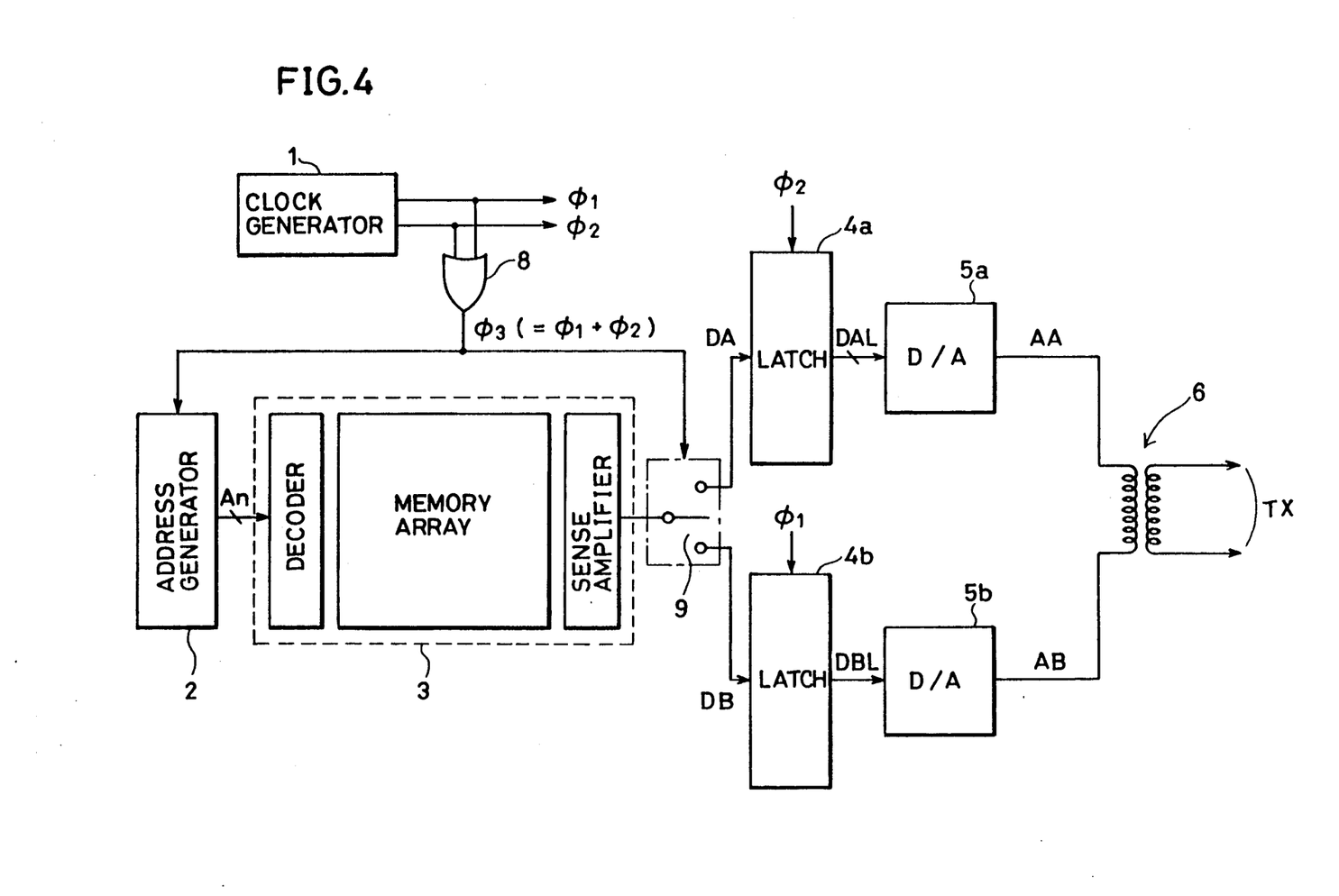
FIG. 4 is a block diagram of a circuit of a waveform generator showing another embodiment of the invention.

Referring to FIG. 4, the waveform generator showing another embodiment of this invention comprises one address generator 2 and one memory 3. Clock signals φ1 and φ2 provided from the clock generator 1 each are applied to the OR gate 8 where clock signal φ3 having two times the frequency of the clock signals φ1 and φ2 is obtained. The clock signal φ3 is applied to the address generator 2 and the switching circuit 9. The switching circuit 9 responds to the clock signal φ3 for selectively providing the data read from the memory 3 to either the latch circuits 4a or 4b alternately. Thus, by employing as the memory 3 a memory operable in response to the clock signal φ3 having two times the frequency, pulse signals TX can be obtained in the same manner as that in case of the waveform generator shown in FIG. 1. As a result, the area on the semiconductor substrate necessary to form an address generator 2 and memory 3 is reduced compared to that of the waveform generator shown in FIG. 1.

Figure 5A:
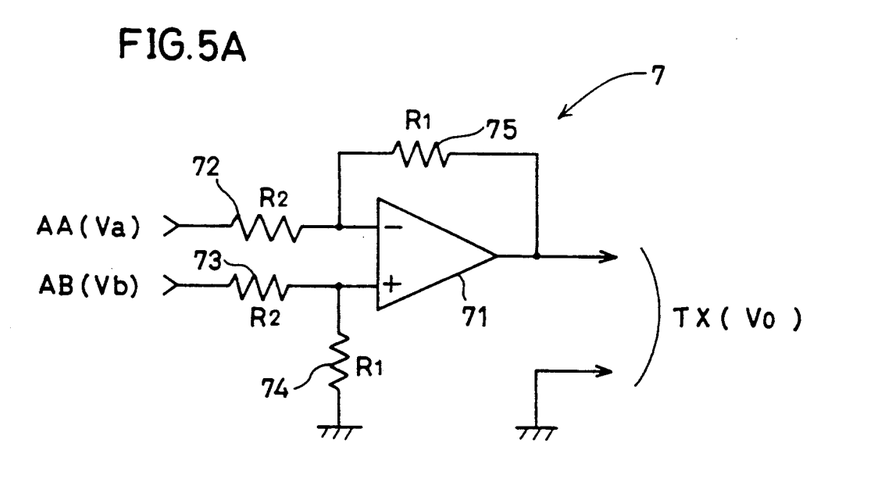
FIG. 5A is a circuit diagram of an example of a differential amplifier applicable to the waveform generator indicated in FIGS. 1 and 4.

Referring to FIG. 5A, a differential amplifier 7 adaptable in place of the pulse transformer 6 shown in FIGS. 1 and 4 comprises an operational amplifier 71, a resister 72 connected to the inverting input of the operational amplifier 71, a resister 73 connected to the non-inverting input of the operational amplifier 71, a resister 74 connected between the non-inverting input and ground, and a feedback resister 75. The input voltage Va is supplied through the resister 72 to the inverting input of the operational amplifier 71. The input voltage Vb is supplied via the resister 73 to the non-inverting input of the amplifier 71. Thus, where the resistance value of the resisters 72 and 73 is R$_2$, and the resistance value of resisters 74 and 75 is R$_1$, the output voltage Vo is represented by the following equation:

$$Vo = (Vb - Va) \cdot R_1/R_2 \qquad (1)$$

In the case where the differential amplifier 7 shown in FIG. 5A is applied to the waveform generator of FIGS. 1 and 4, the analog voltage AA from the D/A converter 5a is provided as the input voltage Va, while the analog voltage AB from the D/A converter 5b is provided as the input voltage Vb. As a result, the pulse signal TX is obtained as the output voltage Vo. When the differential amplifier 7 shown in FIG. 5A is employed, the gain is preferably set to the level of one to several multiples.

In the above embodiments, two D/A converters 5a and 5b were used, but in the case where the differential amplifier 7 shown in FIG. 5A is employed, an increase in the number of inputs of the differential amplifier makes it possible to supply many more output voltages with their phases shifted. In that case, the same effect as above would be achieved by not only detecting the difference between the output voltage of D/A converters 5a and 5b, but also by detecting the sum.

Figure 5B:
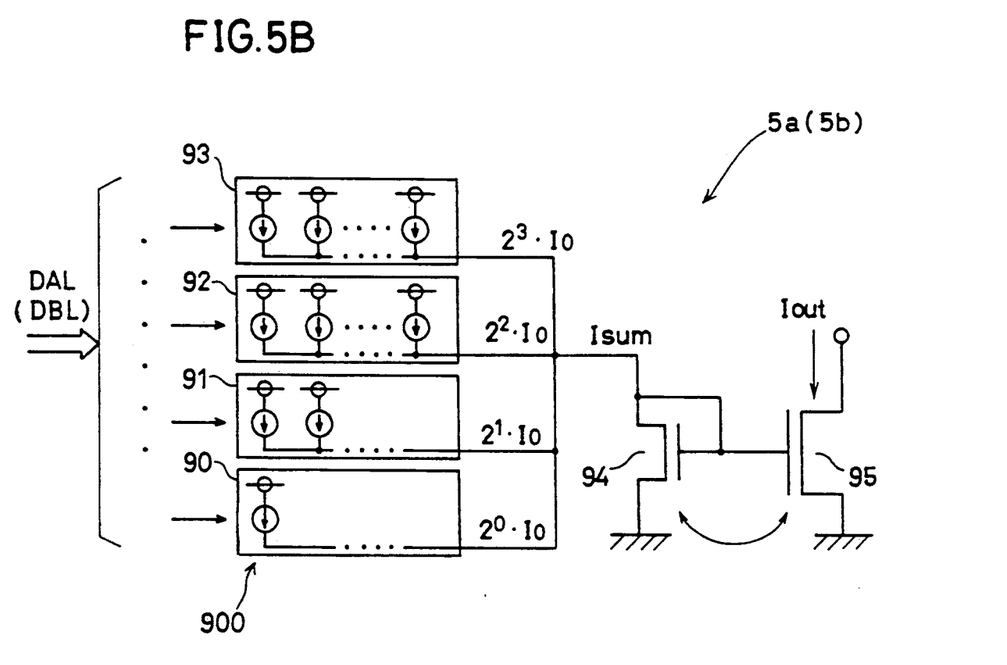
FIG. 5B is a block diagram of the D/A converter of FIGS. 1 and 4.

FIG. 5B shows the D/A converter 5a that can be used as D/A converters 5a and 5b of FIGS. 1 and 4. The D/A converter 5a operates in accordance with the current summing method. D/A converter 5a comprises a current cell array 900 including current sources 90-93, and NMOS transistors 94 and 95 forming the current mirror circuit. Each of the current sources 90-93 comprises $2^i$ (i=0, 1, 2, 3) current cells. Each of the current sources 90-93 provides a predetermined current (i.e., Io, 2Io, 4Io, . . .) in response to each bit of data DAL from latch circuit 4a. Because the total sum of the current provided from current sources 90-93 flows through transistor 94, current Iout determined by data DAL flows through transistor 95. Current Iout is provided to the primary winding of transformer 6 of FIG. 1.

Figure 5C:
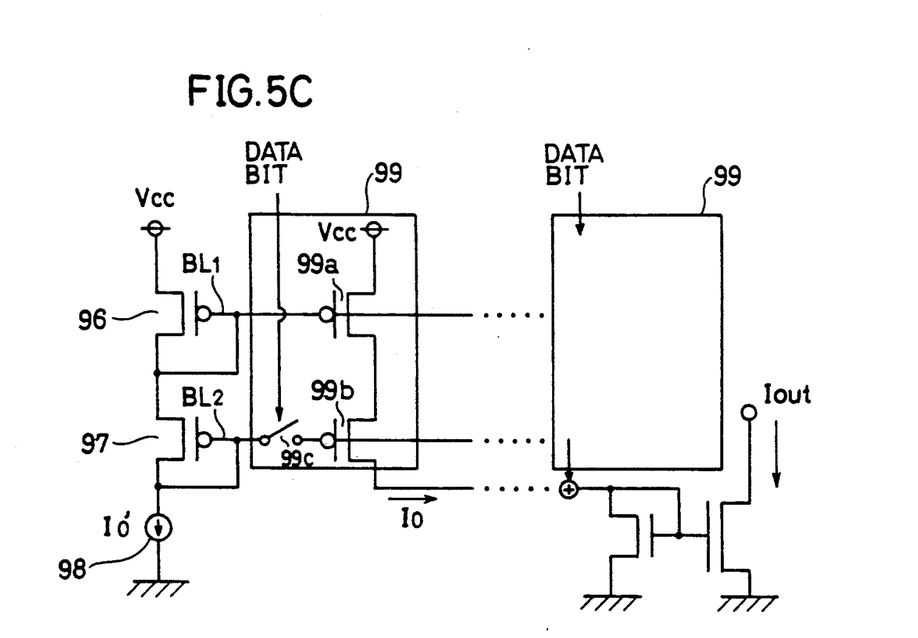
FIG. 5C is a circuit diagram of the current cell of FIG. 5B.

An example of the current cell circuit 99 is shown in FIG. 5C. Current cell 99 comprises serial connected PMOS transistors 99a and 99b, and a switching device 99c. Transistor 99a has the gate connected to bias line BL1. Transistor 99b has the gate connected to bias line BL2 via switching device 99c. PMOS transistors 96, 97 and a constant current source 98 are connected in series between power supply Vcc and ground to implement a bias circuit. The bias circuit provides bias voltages to each gate of transistors 99a and 99b via bias lines BL1 and BL2, respectively. Accordingly, each current cell 99 provides constant current Io in response to one data bit signal of DAL.

By employing the waveform generator of FIGS. 1 and 4 in the communication LSI chip 20 of FIG. 7, pulse signal TX is obtained which changes at two times the frequency of the provided clock signals φ1 and φ2, that is, which varies at two times the operation frequency of the D/A converters 5a and 5b. That is to say, pulse signals having a waveform with a higher slew rate for data transmission can be generated. The pulse signal TX has a waveform which satisfies the pulse as shown in FIG. 8, in other words, the waveform of pulse signal TX meets the requirements of CCITT's Recommendation. In FIGS. 1 and 4, a differential amplifier shown in FIG. 5A can be used in place of the pulse transformer 6. Pulse signals are generated which have a particular waveform variable at two times the frequency of the provided timing signal. That is to say, the data transmission signal generator according to the present invention is able to generate pulse signal having a high speed variable waveform.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data signal generator for generating pulse signals having a waveform with a high slew rate, comprising: displaced means for generating first and second phase timing signals, to first waveform signal generating means responsive said first timing signal for generating a first signal component of said waveform, second waveform signal generating means responsive to said second timing signal for generating a second signal component of said waveform displaced in time from said first signal component, and difference detecting means responsive to said first and second waveform signal components for providing said waveform.

2. A data signal generator according to claim 1, wherein said first and second waveform signal generating means comprises memory means including memory cells for storing first and second sampling data obtained by sampling said waveform at first and second sampling timing, reading means responsive to the first and second timing signals for reading out said first and second sampling data from said memory means, first D/A converting means responsive to the first sampling data read from said reading means for providing said first signal component by D/A conversion, and second D/A converting means responsive to the second sampling data read by said reading means for providing said second signal component by D/A conversion.

3. A data signal generator according to claim 2, wherein said memory means comprises:

first memory means for storing the first sampling data, and second memory means for storing the second sampling data.

4. A data signal generator according to claim 2, wherein said memory means comprises common memory means for commonly storing the first and second sampling data.

5. A data signal generator according to claim 2, wherein said reading means comprises:

addressing means responsive to the first and second timing signals for addressing said memory cells, and sense amplifying means connected to said memory means for amplifying data signals stored in the memory cells addressed by said addressing means, each of said first and second D/A converting means receiving the amplified data signals from said sense amplifying means as said first and second sampling data, respectively.

6. A data signal generator according to claim 4, further comprising:

selectively providing means coupled to said common memory means and responsive to said first and second timing signals for selectively providing the stored sampling data to said first and second D/A converting means.

7. A data signal generator according to claim 1, wherein said difference detecting means comprises transformer means having a primary winding and a secondary winding, said transformer means having the primary winding connected to receive the first and second waveform signal components, whereby said waveform is provided via the secondary winding of said transformer means.

8. A data signal generator according to claim 1, wherein said difference detecting means comprises a differential amplifier means connected to receive said first and second waveform signal components.

9. A data signal generator according to claim 1, wherein said waveform comprises a data transmission waveform compatible with integrated services digital network standards.

10. A data signal generator for generating pulse signals having a predetermined waveform, comprising:

means for generating a plurality of timing signals having the same repetition rate but offset from each other in phase, first waveform signal generating means responsive to the first timing signal for generating first digital signal samples of said predetermined waveform, second waveform signal generating means responsive to said plurality of timing signals for generating second digital signal samples of said predetermined waveform displaced in time from said first signal samples, first D/A converter means having a particular maximum slew rate for converting said first digital signal samples to corresponding analog signal samples:

second D/A converter means having a particular maximum slew rate for converting said second digital signal samples to corresponding analog signal samples, and difference detecting means responsive to said first and second analog signal samples for providing an output signal having said predetermined waveform.

11. A data signal generator according to claim 10, wherein said predetermined waveform has a slew rate that is greater than the slew rate of first and second D/A converter means.

12. A system for transmitting data signals on an Integrated Services Digital Network (ISDN) channel, comprising:

a source of first and second timing signals displaced in phase from each other, memory means storing first and second sampling data corresponding to first and second time displaced waveform portions of a data pulse, means responsive to said first and second timing signals for reading out successively said first and second sampling data stored in said memory means, first and second digital D/A converter means for converting said first and second sampling data read out from said memory means, said first and second D/A converter means having a particular maximum slew rate capability, and means for combining analog output signals provided by said first and second D/A converter means to form said data signals.

13. The system of claim 12, wherein said first and second D/A converter means are implemented by MOS transistor circuitry.

14. The system of claim 12, wherein said data signals have a slew rater greater than said particular maximum slew rate capability.

15. A method for generating a data signal having a high slew rate waveform suitable for data transmission, comprising the steps of:

generating a first signal component of said waveform in response to said first timing signal, generating a second signal component of said waveform displaced in time from said first signal component in response to said second timing signal, and detecting the difference between said first and second waveform signal components to provide said waveform.

16. The method according to claim 15, wherein said data transmission is in an integrated services digital network.

* * * * *